Patented June 4, 1929.

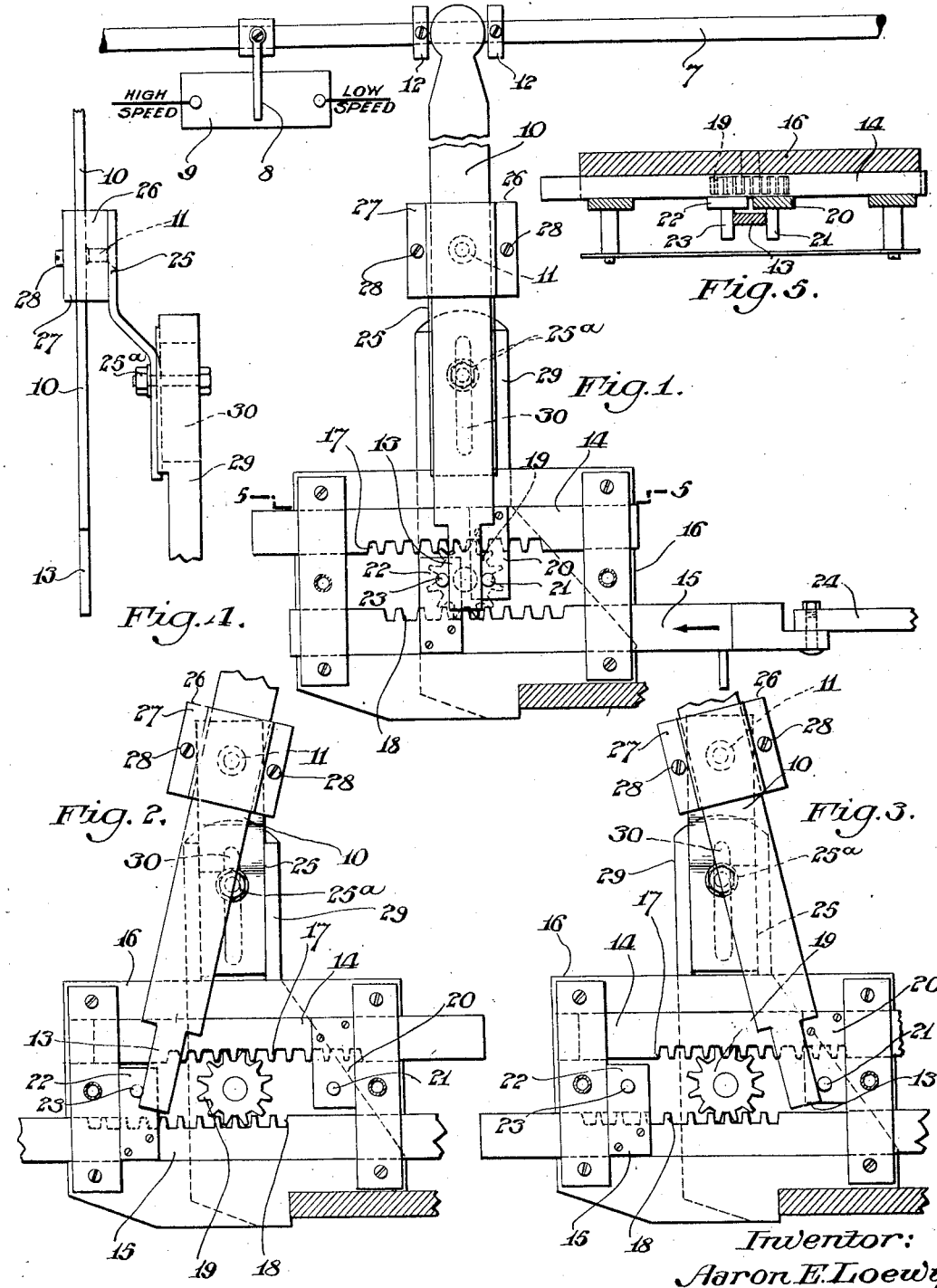

1,715,850

UNITED STATES PATENT OFFICE.

AARON E. LOEWY, OF PHILADELPHIA, PENNSYLVANIA, ASSIGNOR, BY MESNE ASSIGNMENTS, TO ROSE LIBERMAN AND HERMAN P. LIBERMAN, BOTH OF PHILADELPHIA, PENNSYLVANIA.

CONTROLLER ACTUATION.

Application filed June 21, 1926. Serial No. 117,359.

The invention relates to controller actuation. The object is to provide means whereby an element may be moved in either of two opposite directions, from neutral position, for operating for instance a motor control, either for low or high speed, and with each movement of said element, in either of its two directions, movement will be communicated in one direction only to a shifting element, for example of a machine, in order to return the operative parts thereof to initial or starting position.

The invention is especially applicable to the control of full-fashioned hosiery knitting machines, such as described in my pending application, Serial No. 727,858, filed July 24, 1924. In the machine described in this application a horizontal rod is provided which extends across the machine and is adapted to be shifted by the operator to actuate a motor switch or other suitable control for starting the machine. A pivoted lever is arranged in operative relationship with said shift rod and also with elements of the knitting machine, so that when the shift rod is moved to start the motor, the lever is also actuated to move the elements of the knitting machine into initial or starting position, and when the machine has performed a predetermined operation, as for example, has knitted a predetermined number of courses, an element of the machine will communicate movement through said lever to said shift rod to stop the motor. The stopping is automatic.

In accordance with the arrangement described in said application means are provided to start and stop the motor, which may be called a one speed control.

Now the object of the present invention is to provide means whereby the shift rod may be shifted either to the right or the left from a neutral point; for example, to the right to give a low speed, and to the left, to give a high speed, and with each movement, either to the right or to the left of the neutral point, to cause a movement, in one direction only, of the machine elements to initial or starting position; and when the lever is automatically actuated by the machine element, after predetermined operation, the shift rod will be actuated by said machine element to neutral position to stop the motor.

In other words whenever the pivoted lever, operating and operated by the shift rod, which controls the motor or power, moves either to the right or to the left from neutral position, a shifting element on the machine is moved by said lever in one direction only, to bring the machine parts into initial or starting position, and when the machine element operates upon the lever, after the predetermined operation of the machine, the lever and shift rod whether to the right or the left of neutral, will be returned thereby to neutral position.

Referring to the drawings which illustrate merely by way of example suitable means for effecting my invention:—

Fig. 1 is an elevation showing the parts in neutral position.

Fig. 2 is an elevation showing the lower end of the lever moved into low speed position.

Fig. 3 is an elevation showing the lower end of the lever moved into high speed position.

Fig. 4 is a detail in elevation, showing means for adjusting the lever fulcrum.

Fig. 5 is a section on line 5, 5 of Fig. 1.

Similar numerals refer to similar parts throughout the several views.

The shift rod 7 is similar to the usual hand operated shift rod control for knitting machines, except that it is adapted to move from a neutral position either to the right or left, as required for two-speed control. This rod is connected to a controller element or switch arm or similar device 8, operating the motor control 9, either for high speed or for low speed, as indicated. The lever 10 has an adjustable pivot support or fulcrum between its two ends, as at 11. The upper end of the lever projects between the lugs 12 on the rod 7 and therefore must move with said rod. It is provided at its lower end with a pin or lug engaging end 13. The slide bars 14 and 15 are suitably mounted to slide or reciprocate in the frame 16. These bars 14 and 15 are provided with rack formations 17 and 18, meshing with the pinion 19, mounted on a stationary stud. The bar 14 is provided with a bracket 20 carrying a pin or lug 21, while bar 15 is provided with a bracket 22 carrying a pin or lug 23. These pins or lugs 21 and 23 are on a line with the axis of pinion 19. The bar 15 is connected with an element 24 of a shifting mechanism, which when moved in one direction sets the machine parts in initial or starting position, and when moved in the opposite direction, actuates the lever 10 and associated mechanism to stop the machine. The lever 10 is secured with respect to fulcrum 11. The adjustment of fulcrum 11 with respect to lever 10, is secured by the following means: A block 26 is channelled to receive the lever 10 so that the lever 10 may slide up and down therein. A clamp plate 27 having the clamping screws 28, is adapted to clamp the lever 10 in any desired position in block 26. Block 26 is connected by the pivot 11 to the arm 25 so that the block with its lever 10 may swivel on the pivot or fulcrum 11. When the lever 10 is shifted up or down with respect to its fulcrum 11, it is important that its two ends remain in their respective relationship, at the top with lugs 12 and at the lower end with pins 21 and 23. To accomplish this the arm 25 is adjustable in the bracket 29 or other stationary part of the machine. This is accomplished by means of bolt 25ª movable in the slot 30. This adjustment of the fulcrum 11, with respect to lever 10, is desirable in order to secure the desired relative throw of the upper and lower ends of lever 10.

In operation:

As above stated, when the shift rod 7 is in neutral position, as shown in Fig. 1, the motor is cut out of circuit. When rod 7 is moved, for instance to the right, the controller arm 8 is operated to throw in the low speed, and when said rod is moved to the left the motor operates at high speed, and when the rod is brought back to neutral position, the motor stops.

Now it must be obvious, that when the motor is started, whether at high speed or at low speed, the shifting elements of the machine, including elements 15 and 24 must in each case be moved in the same direction to set the parts of machinery in initial or starting position.

It will be noted that when the upper end of lever 10 is moved to the right, the lower end 13 will engage pin or lug 23 carried by element 15, and shift element 15 to the left as shown in Fig. 2, which is the movement of elements 15 and 24 that set the machine parts in initial or starting position.

When the upper end of lever 10 is moved to the left, the lower end 13 will engage lug or pin 21 carried by element 14, and shift element 14 to the right. The rack formation 17 of element 14 engaging pinion 19 will communicate movement through the pinion to rack formation 18 and thus shift element 15 to the left, as in the first instance. So that whenever the upper end of lever 10 is moved from the neutral position, whether to the right or to the left, the element 15 will always be shifted to the left, that is to the starting position.

When the element 24 and consequently element 15, are automatically moved to the right into neutral position shown in Fig. 1, after the predetermined operation of the machine, as fully described in my said pending application No. 727,858, the two lugs 21 and 23 will be brought together as shown in Fig. 1, by the action of the racks and pinion, thus bringing the lever 10 and switch element 8 into neutral position.

What I claim is:—

1. The combination with a power controller shift rod, a pivoted lever having one end in operative relationship with the shift rod, and adapted to move to the right and to the left from a neutral position, a pinion and two reciprocating elements having racks cooperating with the pinion, and lugs adapted to cooperate with the other end of the lever, so arranged that when the lever is moved from neutral position, either to the right or to the left, one of said reciprocating elements will always move in one direction only.

2. The combination with a power controller shift rod, a pivoted lever having one end in operative relationship with the shift rod, and adapted to move to the right and to the left from a neutral position, a pinion and two reciprocating elements having racks cooperating with the pinion, and lugs adapted to cooperate with the other end of the lever, so arranged that when the lever is moved from neutral position, either to the right or to the left, one of said reciprocating elements will always move in one direction only, and when said reciprocating element is moved in the opposite direction, the lever will be actuated to return to neutral position.

3. In combination with a high speed and low speed power controller, a controller element movable from neutral to high speed or low speed and vice versa, a controller actuator adapted to be arbitrarily operated and also automatically operated, a machine shift element, and movement transmission mechanism effective between said shift element and the controller actuator, whereby the machine shift element is moved in one direction only when the controller is moved either to high speed or to low speed position, and whereby when the machine shift element is moved in the opposite direction, the controller is moved into neutral position.

4. In combination with a high speed and low speed controller, a controller element, a pivoted lever in operative relationship therewith, a machine shift element having a rack bar connected thereto, a second rack bar parallel therewith, a pinion cooperating with both rack bars, each rack bar having an abutment, said abutments adapted to engage the opposite sides of the pivoted lever whereby the movement of the pivoted lever in either direction will move the shift element in one direction only.

5. In combination with a high speed and low speed controller, a controller element, a pivoted lever in operative relationship therewith, a machine shift element having a rack-bar connected thereto, a second rack bar parallel therewith, a pinion cooperating with both rack bars, each rack bar having an abutment, said abutments adapted to engage the opposite sides of the pivoted lever, whereby the movement of the pivoted lever in either direction will move the shift element in one direction only, and whereby when the shift element is moved in opposite direction the lever is shifted either from the right or the left to neutral position.

AARON E. LOEWY.